Dec. 7, 1971   W. A. HESKE   3,625,062

PRESSURE INDICATING APPARATUS

Filed Aug. 24, 1970

INVENTOR
WILLIAM A. HESKE

ATTORNEY

United States Patent Office 3,625,062
Patented Dec. 7, 1971

3,625,062
PRESSURE INDICATING APPARATUS
William A. Heske, 2101 Burr St., Fairfield, Conn. 06430
Continuation-in-part of application Ser. No. 859,246, Sept. 17, 1969, which is a continuation-in-part of application Ser. No. 732,472, Apr. 12, 1968, which in turn is a continuation-in-part of application Ser. No. 565,857, July 18, 1966. This application Aug. 24, 1970, Ser. No. 66,366
Int. Cl. G01l 9/00
U.S. Cl. 73—398 R   11 Claims

ABSTRACT OF THE DISCLOSURE

Apparatus for effecting absolute or differential pressure sensitivity of a pressure measuring device. A bellows atmospherically balanced against a system pressure unit, such as a Bourdon tube or second bellows, is either evacuated for absolute pressure sensitivity or connected to a pressure source for differential pressure sensitivity.

CROSS-REFERENCE TO RELATED APPLICATIONS

This application is a continuation-in-part of application Ser. No. 859,246, filed Sept. 17, 1969, which in turn is a continuation of application Ser. No. 732,472, filed Apr. 12, 1968 (now abandoned), and which in turn is a continuation-in-part of application Ser. No. 565,857, filed July 18, 1966 (now abandoned), all entitled "Condition Responsive Apparatus."

BACKGROUND OF THE INVENTION (1) The field of art to which this invention relates comprises, for example, devices which provide an indication or control operation in response to a particular variable condition such as fluid pressure, temperature, etc.

(2) In most condition responsive instruments such as a pressure gauge or the like for providing visual or other indication of pressure values in the system to which it is connected, the instrument is characterized by gage pressure sensitivity, i.e., gage pressure in contrast to absolute pressure of the system being measured. Where measurements based on absolute pressure have been desired, it is known to evacuate the interior chamber of the entire gauge housing to full vacuum. While achieving the expected result this condition subjects the entire unit to the continual problem of maintaining adequate seals and structural integrity against the exposed collapse forces of atmospheric pressure. As can be appreciated, fabricating an entire gauge housing to be maintained under constant vacuum for commercial conditions presents many difficulties of manufacture from the standpoint of both effecting and maintaining a vacuum sealed condition for the useful life of the instrument. Where the gauge housing is a relatively large volume, evacuation for absolute pressure sensitivity becomes not only difficult but highly impractical.

Recently there has been discovered a novel condition responsive apparatus as disclosed in the parent application hereof and capable of pressure measurement indication or signal emission to a high level of accuracy. The unit thereof employs the principle of force balance, null-position operation in which discrete changes in condition being measured produces bi-directional movement of a sensor from the null-position to in turn generate operating signals correlated and proportional to the degree of condition change. The signals so generated are effective via a drive mechanism to restore balance at null-position while concomitantly indicating gage values of the incurred condition. Being adapted for a high degree of sensitivity and readout accuracy, the unit includes a combination of mechanical drive with motive power from a variety of selective energy sources, such as pneumatic, electronic, electric, etc. With the extensive operating mechanism utilized, the housing which encloses the unit is of relatively substantial volume as compared, for example, to a simple pressure gauge of the prior art. To effectively evacuate such a housing for absolute pressure sensitivity of an instrument to be marketed commercially, has been determined to be both costly and impractical, if not virtually impossible.

SUMMARY

This invention relates to apparatus for effecting absolute or differential pressure sensitivity of a pressure measuring device. More particularly, the invention relates to an apparatus for effecting such sensitivity in a force balance null-position type pressure indicator as, for example, disclosed in the parent application hereof whereby to convert its sensitivity from gage pressure to absolute or differential pressure. In accordance herewith, these results are achieved without need to evacuate an entire housing chamber as in the prior art, but rather is effected by a non-complex construction readily compatible with established manufacturing procedures for the instrument. To effect absolute pressure sensitivity by means hereof, an evacuated bellows is atmospherically balanced in opposition against the null-position system sensing unit by which a movement is produced in response to condition changes. Since the bellows represents a relatively small internal volume, evacuation is readily obtained without need for complex housing seals or sealing as in the prior art. By placing a pair of unevacuated bellows, each atmospherically balanced and in opposition with respect to the other, the unit can be readily operated on differential instead of absolute pressure sensitivity. It should be appreciated that achieving the result in this manner is both expedient and less costly compared to such prior art techniques as to amount to a substantial advance in the art.

It is, therefore, an object of the invention to provide novel apparatus for effecting absolute pressure sensitivity of a pressure measuring unit.

It is a further object of the invention to provide apparatus adapted to readily and simply convert a force balance null-position type pressure indicating apparatus from gage pressure to absolute pressure sensitivity.

It is a further object of the invention to effect the aforesaid objects in a manner that eliminates need to evacuate an entire housing chamber as known for effecting similar results in the prior art.

It is a still further object of the invention to provide apparatus for effecting the aforesaid objects which conveniently lends itself to unit operation for measuring either absolute or differential pressures to which it is desired that the unit be sensitive.

Figures 1, 2:
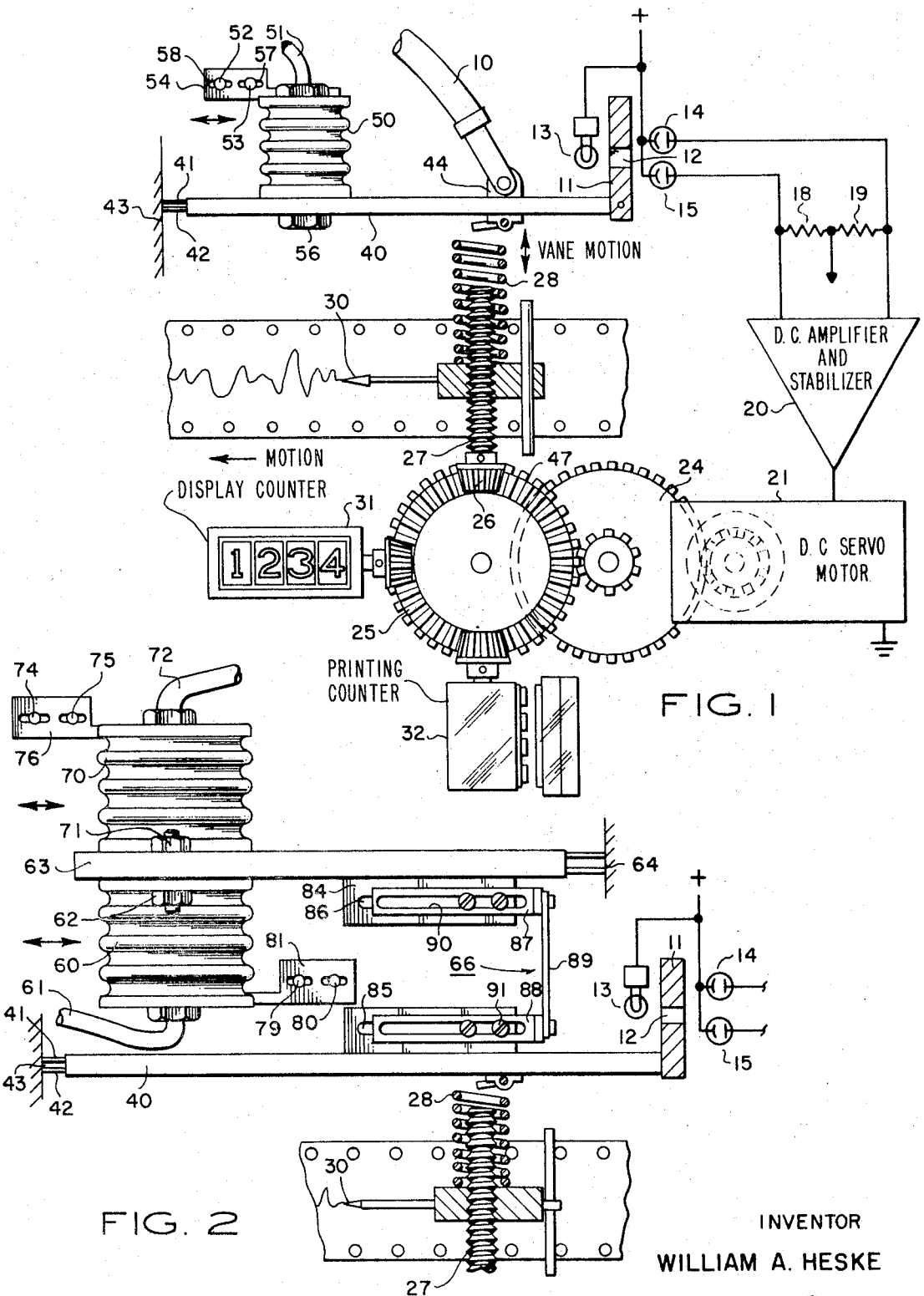
FIG. 1 is a schematic representation of an embodiment of the invention in accordance herewith as generally adapted for absolute pressure measurement on the order of 50 p.s.i.a. and above.
FIG. 2 is a second schematic embodiment of the invention in accordance herewith as adapted for relatively low absolute and differential pressures generally on the order of 50 p.s.i.a. and below.

Reference is now made to the drawings in which the invention hereof is disclosed in conjunction with a pressure indicating apparatus of the aforesaid null-position type as disclosed in the parent application and incorporated herein by reference. Whereas various embodiments are disclosed in the parent application enabling operation in conjunction with a variety of energy sources, such as electronic, pneumatic, electrical, etc., for sake of briefness only the electronic embodiment will be alluded to for an understanding of the invention hereof. It is understood, of course, that use of the invention is not intended to be so limited.

Referring now specifically to FIG. 1, pressure of the system being measured is communicated to the forward free end of a Bourdon tube 10 normally connected to a vane member 11. The vane member has a transverse slit 12 which when in the null-position is located intermediately positioned between a constantly energized lamp 13 and dual photo-cell elements 14 and 15. In this relation, a constant but minimal illumination is exposed to each of the photo-cells and by virtue of a balanced bridge circuit formed by resistors 18 and 19 intermediately biased to ground, a zero voltage differential exists across the inputs to differential amplifier-stabilizing network generally designated 20. Movement of Bourdon tube 10 in response to changes in the sensed pressure condition, causes the light beam passing through slit 12 to be shifted off center as to unbalance the bridge and result in an amplified signal to drive DC servo-motor 21. Both direction and operational rate of motor 21 is correlated and proportional to the position shift of slit 12 and is effective via a feedback mechanism comprising gears 24, 25, and 26, lead-screw 27 and feedback spring 28 to return vane slit 12 to null-position at which the light beam rebalances the bridge. In the course of rebalancing to null-position, the feedback mechanism is adapted to operate a variety of remote indicators such as transcribing pen 30, visual display 31 and/or printing counter 32, by which the measured condition can be appropriately indicated. As thus far described, the instrument is adapted for gage pressure sensitivity in response to system gage pressure being communicated to Bourdon tube 10.

To adapt, convert or otherwise effect absolute pressure sensitivity of the unit, there is provided a cantilevered flexure beam 40 connected at its secured end via pivots 41 and 42 to a stationary support 43. The free end of Bourdon tube 10 is connected to the beam at intermediate location 44 toward the free end thereof and through the remaining beam portion operates vane 11 secured to the beam at its terminal end. In this manner movement of the free end of Bourdon tube 10 is readily transmitted to vane 11 for shifting slit 12 relative to the null-position intermediate photo-cells 14 and 15.

At a location along the length of beam 40 between support 43 and connection 44 there is provided a bellows 50 positioned extending axially lateral to the beam for acting in atmospheric opposition to that afforded by Bourdon tube 10. In order to render operation of bellows 50 reliably effective as a true function of changes in atmospheric pressure, equal pressure is first supplied to both Bourdon tube 10 and to the interior of bellows 50 via connecting tube 51. Bellows 50, by loosening screw 56, is then adjustably positioned along beam 40 until its position is such that equal pressure changes applied to both the bellows and Bourdon tube produce identical and balanced moments about pivots 41 and 42. This condition represents an atmospheric balance between bellows 50 and Bourdon tube 10 as evidenced by vane 11 having an absence of net motion as pressure changes occur within the range of expected barometric pressure variation. On achieving an atmospheric balance between bellows 50 and Bourdon tube 10, the bellows position is secured to the beam via lock screw 56 and to a fixed stationary support (not shown) via a pair of screws 52 and 53 extending through a bracket 54 having screw slots 57 and 58. With the bellows and Bourdon tube in atmospheric match, the former is then evacuated via tube 51 to a pressure on the order of 20 microns Hg or below after which tube 51 is cut and sealed tight at its end. Thereafter, any fixed pressure applied to Bourdon tube 10 will not have its indication affected by atmospheric pressure as to enable the pressure measuring device to be truly responsive to absolute pressure. Selection of a proper bellows 50 for the purposes described should of course be based on an effective area thereof able to produce a moment against beam 40 equal to that produced by Bourdon tube 10 with identical pressures applied in each. Also, the bellows spring rate must be sufficiently low as to effect good motion sensitivity to unbalanced pressures.

The embodiment of FIG. 2, which will now be described, is generally adapted for lower magnitudes of absolute or differential pressure ranges on the order of about 50 p.s.i.a. and below. This embodiment includes a bellows 60 receiving system pressure via connecting tube 61 in a manner similar to Bourdon tube 10 above. The bellows is secured via a pair of opposing nuts 62 to a cantilevered flexure beam 63 secured at its fixed end to a stationary support 64.

Flexure movement of beam 63, as will be understood, is transmitted through a span mechanism 66 to beam 40 to which vane 11 is connected as above. Acting to oppose bellows 60 in a manner similar to bellows 50 above is a bellows 70 likewise secured to beam 63 via a pair of opposing nuts 71. The position of bellows 70 along beam 63 is substantially coincident with that of bellows 60 although some offset may be necessary to compensate for possible manufacturing differences. As before, perfect atmospheric matching is first obtained between the bellows by supplying identical pressure internally of bellows 60 via inlet tube 61 and to bellows 70 via inlet tube 72. With identical pressure being maintained, lock-nuts 62 and 71 are loosened and the respective bellows shifted along beam 63 relative to each other until each produces an equal and opposite moment on the beam when identical pressures are applied as again reflected by the null-position relation of vane slit 12. With pressure balance or match obtained, lock nuts 62 and 71 are secured and screws 74 and 75 extending through slotted wall bracket 76 are tightened to a stationary support (not shown) to secure the operating location of bellows 70. Similarly, screws 79 and 80 extending through slotted wall bracket 81 are tightened to a stationary support (not shown) to secure the operating location of bellows 60. In this arrangement, as before, the unit is rendered responsive to absolute pressure by then evacuating bellows 70 similarly in the manner described above.

In the event it is desired to operate the embodiment of FIG. 2 for measurement of differential pressure instead of absolute pressure, bellows 70 is not evacuated but instead has its tube 72 extended into communication with a second pressure source to be sensed (not shown). Under differential operating conditions, the forces acting upon beam 63 will be a function of the differential in pressures received respectively within tubes 61 and 72.

Span adjustment mechanism 66 (which can be omitted if not desired) permits a change in the effective force exerted by system pressure via the Bourdon tube in response to a given condition change. It is noted that the adjustment mechanism 66 is interposed between beams 63 and 40, permitting adjustment of the effective force produced by the pressure measuring system as measured at the axis of screw 27. The mechanism includes a pair of fold-over flanges 84 and 85 secured respectively to beams 40 and 63 and each having an elongated adjustment slot 86 therein. Supported in slidable overlying relation to each of the flanges are span slides 87 and 88 joined by a flexure spring 89 and each having an elongated adjustment slot 90 through which screws 91 can secure them to their respective flanges.

By the above description there is disclosed novel apparatus for simply and effectively rendering a pressure measuring instrument sensitive to either absolute or differential pressures, as desired. The result is achieved with an arrangement affording greater reliability and substantially reduced manufacturing costs as compared to the previous technique of evacuating the entire housing in which the components are contained. Whereas a distinction in operable ranges between the embodiments of FIG. 1 vs. FIG. 2 has been indicated, it is to be understood as a practical limitation on the characteristic properties of a Bourdon tube vs. a bellows and not as an intended limitation of the invention. It is realized of course, that Bourdon tubes can be produced to operate at pressure ranges below 50 p.s.i.a. and that bellows can be produced to operate at pressure ranges above 50 p.s.i.a.

As many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure measuring apparatus including pressure responsive means adapted for movement in one direction from a null-position in response to a force change from an increasing pressure and adapted for movement in another direction from a null-position in response to a force change from a decreasing pressure, a light source, a vane having slit and adapted for bidirectional movement in conjunction with said pressure responsive means from said null-position past said light source, dual photoelectric cells separately energized to their signal providing levels by light received from said source through said vane slit in response to appropriate movement of said vane, said cells providing a first signal in response to movement of said vane in one direction from said null-position and a second signal in response to movement of said vane in the other direction from said null-position, bidirectional drive means actuated by said cell signals and adapted to generate one motion in response to said first signal and a different motion in response to said second signal, feedback means comprising a linear spring connected between said bidirectional drive means and said vane, said feedback means being responsive to said generated motion to return said vane to said null-position, and output means actuated concomitantly with said feedback means for connection to external means to be operative thereby, the improvement comprising means operably connected to said pressure responsive means and providing a pressure balance in opposition thereto.

2. In a pressure measuring apparatus according to claim 1 in which said pressure responsive means comprises a Bourdon tube and said improvement means comprises a bellows member.

3. In a pressure measuring apparatus according to claim 1 in which both said pressure responsive means and said improvement means comprise bellows members acting in atmospheric opposition with respect to each other.

4. In a pressure measuring apparatus including pressure responsive means adapted for movement in one direction from a null-position in response to a force change from an increasing pressure and adapted for movement in another direction from a null-position in response to a force change from a decreasing pressure, a light source, a vane having a slit and adapted for bidirectional movement in conjunction with said pressure responsive means from said null-position past said light source, dual photoelectric cells separately energized to their signal providing levels by light received from said source through said vane slit in response to appropriate movement of said vane, said cells being connected in a normally balanced circuit and providing a first signal in response to movement of said vane in one direction from said null-position and a second signal in response to movement of said vane in the other direction from said null-position, an amplifier including a conjoined stabilizer circuit and receiving said cell signals to emit amplified signals thereof, bidirectional drive means actuated by said amplifier signals and adapted to generate one motion in response to an amplified second signal, feedback means connected between said bidirectional drive means and said vane, said feedback means being responsive to said generated motion to return said vane to said null-position, and output means actuated concomitantly with said feedback means for connecting to external means to be operative thereby, the improvement for absolute pressure sensitivity comprising pressure sensitive means operably connected to said pressure responsive means providing an atmospheric balance in opposition thereto and evacuated to a high vacuum pressure.

5. In a pressure measuring apparatus according to claim 4 in which said pressure responsive means comprises a Bourdon tube and said pressure sensitive means comprises a bellows member.

6. In a pressure measuring apparatus according to claim 4 in which both said pressure responsive means and said pressure sensitive means comprise bellows members acting in pressure opposition with respect to each other.

7. In a pressure measuring apparatus including pressure responsive means adapted for movement in one direction from a null-position in response to a force change from an increasing pressure and adapted for movement in another direction from a null-position in response to a force change from a decreasing pressure, sensing means comprising a pair of spaced apart sensing elements located defining a null-position therebetween for said pressure responsive means to move relative thereto and operable to provide a first differential signal in response to movement of said pressure responsive means in said one direction away from said null-position and a second differential signal in response to movement of said pressure responsive means in said another direction away from said null-position, differential amplifier means receiving signals from said sensing means to emit an amplified signal correlated and proportional thereto, bi-directional drive means receiving signals from said amplifier and adapted to generate a motion force in a first direction in response to a received signal correlated with said first signal of said sensing means and a motion force in an opposite direction in response to a received signal correlated with said second signal of said sensing means, feedback means including substantially linear spring means connected between said bidirectional drive means and said control means, said feedback means being responsive to said generated motion forces to return said control means to said null-position in opposition to the force change incurred thereby, and output means operable in conjunction with said feedback means for connection to external means to be operative thereby, the improvement comprising means operably connected to said pressure responsive means and providing a pressure balance in opposition thereto.

8. In a pressure indicating apparatus according to claim 7 in which said improvement means is evacuated to a high vacuum pressure adapting said apparatus to absolute pressure sensitivity.

9. In a pressure indicating apparatus according to claim 7 in which said improvement means comprises a pressure sensitive member for connecting to a second pressure source to be measured adapting said apparatus to differential pressure sensitivity.

10. In a pressure indicating apparatus according to claim 8 in which said pressure responsive means comprises a Bourdon tube and said improvement means comprises a bellows member.

11. In a pressure indicating apparatus according to claim 8 in which both said pressure responsive means and said improvement means comprise bellows member acting in balanced atmospheric opposition with respect to each other.

References Cited

UNITED STATES PATENTS

| | | | |
|---|---|---|---|
| 3,045,489 | 7/1962 | Brandt | 73—393 |
| 3,299,701 | 1/1967 | Scarlett | 73—407 X |

DONALD O. WOODIEL, Primary Examiner

U.S. Cl. X.R.

73—407